Feb. 20, 1962    M. CLEMSON    3,022,392
IMPACT-RESPONSIVE SWITCH DEVICE
Filed March 11, 1960    2 Sheets-Sheet 1

INVENTOR.
MAURICE CLEMSON,
BY
McMorrow, Berman & Davidson
ATTORNEYS.

Feb. 20, 1962 M. CLEMSON 3,022,392
IMPACT-RESPONSIVE SWITCH DEVICE
Filed March 11, 1960 2 Sheets-Sheet 2
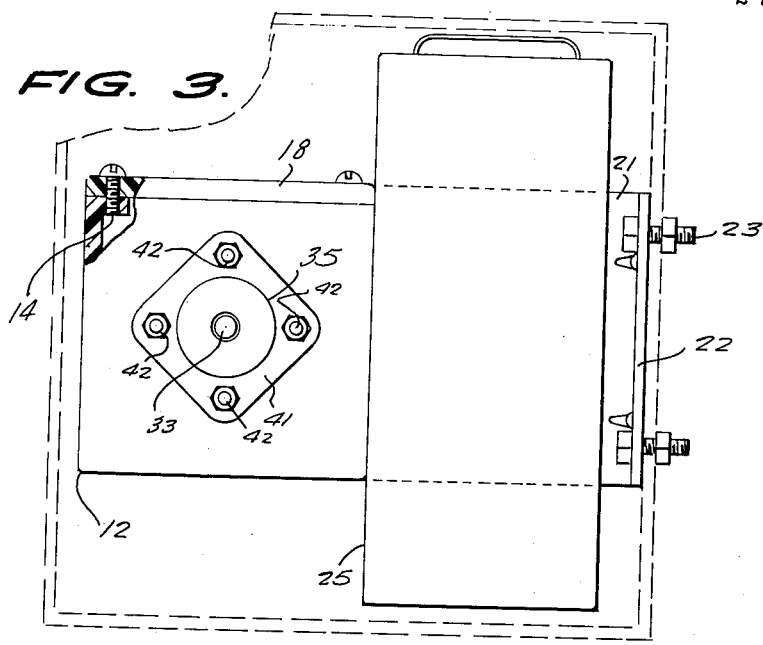
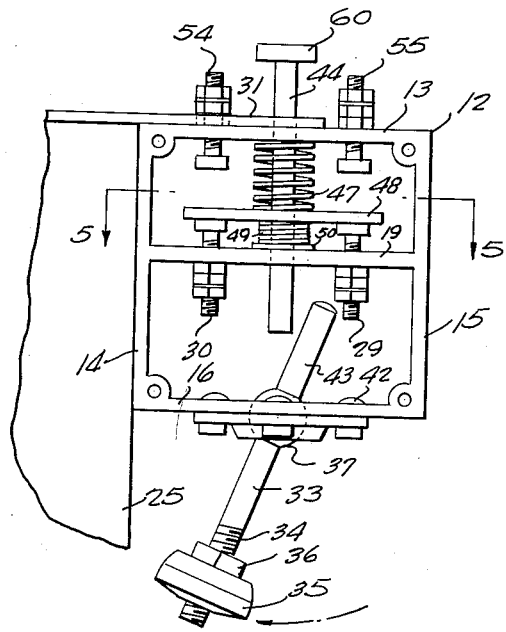
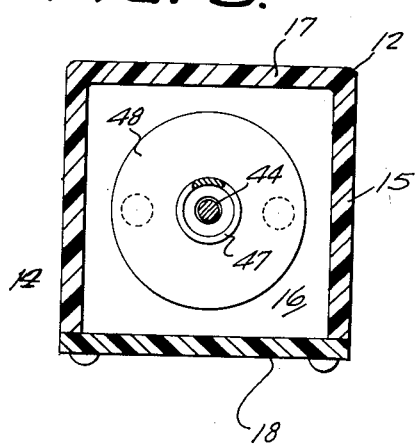
INVENTOR.
MAURICE CLEMSON,
BY
McMorrow, Berman & Davidson
ATTORNEYS.

3,022,392
IMPACT-RESPONSIVE SWITCH DEVICE
Maurice Clemson, 45 S. Veronica Road, West Chester, Pa.
Filed Mar. 11, 1960, Ser. No. 14,360
3 Claims. (Cl. 200—61.5)

This invention relates to impact-responsive switches, and more particularly to an impact-responsive switch adapted to be mounted in a vehicle to control the vehicle electrical system and to energize a distress transmitter.

A main object of the invention is to provide a novel and improved safety device for use on motor vehicles, aircraft, or similar vehicles, the device operating to automatically disconnect the vehicle battery from the vehicle electrical system and at the same time to energize a distress transmitter in response to a collision or other impact, the switch device being simple in construction, being easy to install on a vehicle, and being reliable in operation.

A further object of the invention is to provide an improved impact switch adapted to simultaneously disconnect a vehicle electrical system from its source of energy and at the same time to energize a distress transmitter responsive to an impact, the device being inexpensive to fabricate, durable in construction, being easy to reset, and being relatively compact in size so that it may be conveniently mounted at a desired location in a vehicle.

Further objects and advantages of the invention will become apparent from the following description and claims, and from the accompanying drawings, wherein:

FIGURE 3 is a bottom view, partly in cross section, of the switch device shown in FIGURES 1 and 2.

Figures 1, 2:
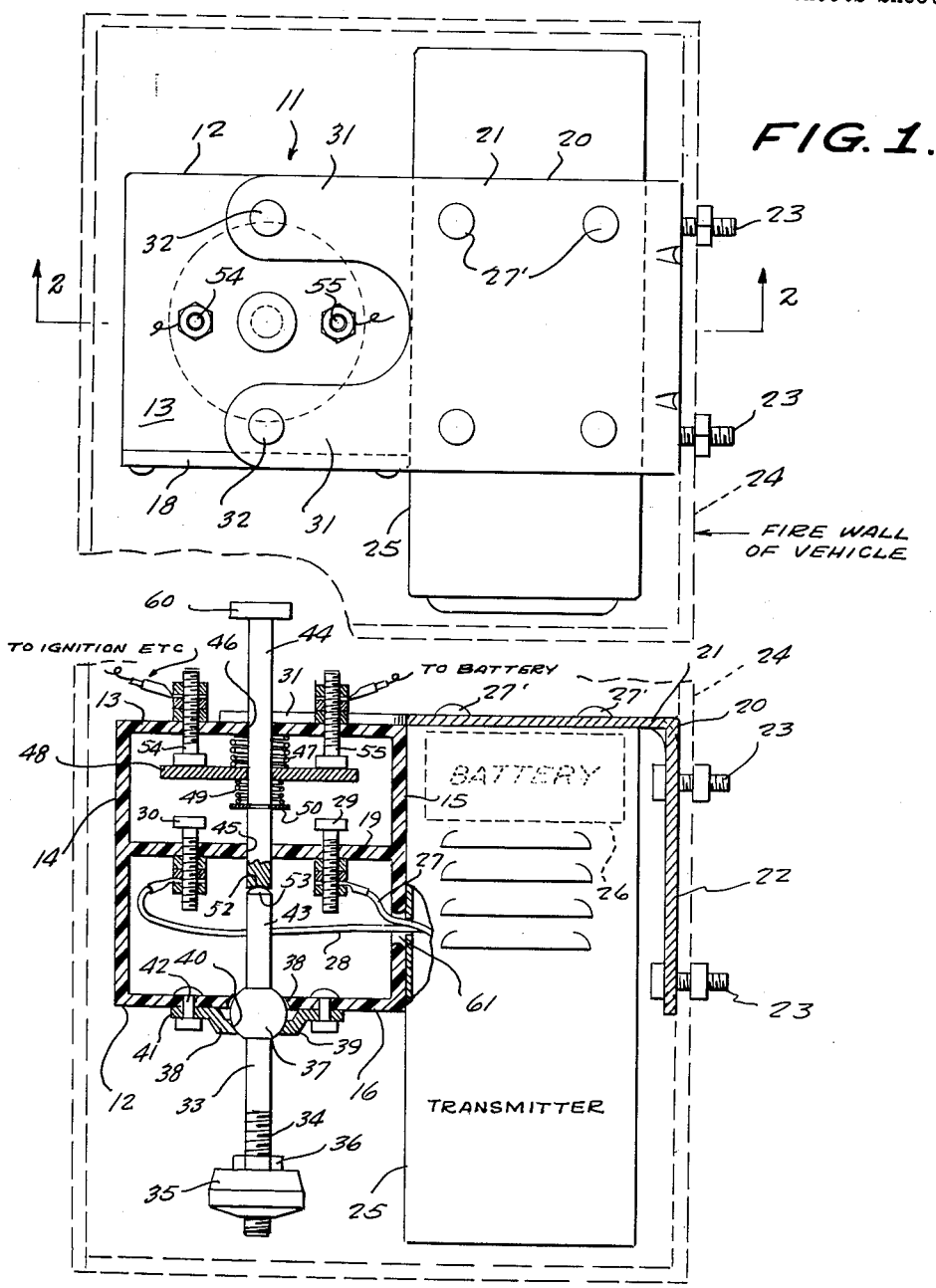
FIGURE 1 is a top plan view of an improved impact-responsive switch device constructed in accordance with the present invention.
FIGURE 2 is a vertical cross sectional view taken substantially on the line 2—2 of FIGURE 1.

FIGURE 4 is a front elevational view of the switch device of FIGURES 1, 2 and 3 with the front cover of its housing removed and illustrating a reverse position of the switch device relative to its supporting mounting, and further illustrating the position of the pendulum member of the switch device subsequent to an impact and illustrating the manner in which the conductive plate member of the device closes the energizing circuit for the associated distress transmitter under these conditions.

FIGURE 5 is a cross sectional view taken on the line 5—5 of FIGURE 4, but showing the front cover in place on the housing of the device.

Referring to the drawings, 11 generally designates an improved switch assembly according to the present invention. The assembly 11 comprises a housing 12 of insulating material which is provided with the top wall 13, the side walls 14 and 15, the bottom wall 16, the rear wall 17 and the detachable front wall 18. The housing 12 is further provided with a horizontal intermediate partition wall 19 which may be formed integrally therewith, as shown in FIGURES 2 and 4.

Designated at 20 is an angle bracket which is provided with a horizontal top flange 21 and a vertical depending flange 22 which is adapted to be secured by a plurality of bolts 23 to any suitable vertical portion of a vehicle, for example, to a vehicle fire wall shown in dotted view at 24.

Designated at 25 is a distress radio transmitter of any suitable type, the transmitter being self-powered and including an energizing battery 26 which is mounted therein. The energizing circuit of the transmitter includes a pair of wires 27 and 28, said wires being adapted to be connected to a pair of spaced switch contacts 29 and 30 mounted on the intermediate wall 19 of the housing 12, as will be presently described.

The transmitter 25 is supported from the horizontal flange 21 of bracket 20 adjacent to the depending vertical flange 22 thereof by suitable fastening members 27' which may comprise bolts, rivets, or the like. The switch housing 14 is supported from the top flange 21 of bracket 20 in a position outwardly adjacent the transmitter 25, as is clearly shown in FIGURE 2, the top flange 21 being provided with a pair of parallel spaced supporting fingers 31, 31 which overlie the housing top wall 13 and which are supportingly secured thereto by suitable fastening bolts 32, 32.

Designated at 33 is a pendulum rod which is provided with the threaded bottom end portion 34 on which is adjustably mounted the pendulum weight element 35, the weight element being threaded on the lower end portion 34 of the pendulum rod 33 and being locked in adjusted position thereon by a lock nut 36 provided above the weight member 35, as is clearly shown in FIGURES 2 and 4. The rod 33 is integrally formed at its intermediate portion with a pivot ball 37 which is rotatably engaged in an aperture 38' provided in the intermediate portion of the bottom wall 16 of housing 12 and which is rotatably supported by a socket member 38 secured to the bottom wall 16. The socket member 38 comprises a cup-like depending element 39 formed with an annular ball seat 40 of spherical contour which pivotally supports the ball 37 and retains the ball in the pivot opening 38' of wall 16, as shown in FIGURE 2. The socket cup member 39 is provided with the peripheral flange 41 which is secured to bottom wall 16 by the respective corner bolts 42.

Rod 33 is provided with the upstanding top end portion 43 which extends upwardly in the housing 12 and which thus defines a shank element which is in alignment with the external portion of the pendulum rod 33 carrying the weight 35. Designated at 44 is a plunger member which is slidably engaged through an aperture provided in the top wall 13 which is in vertical alignment with the aperture 38' in the bottom wall of the housing and which thus guides the plunger member 44 vertically in cooperation with a guide aperture 45 formed in the intermediate wall portion 19. The guide aperture 46 of the top wall 13 cooperates with the guide aperture 45 of the intermediate wall 19 to support the plunger member 44 in alignment with the center of the pivot ball 37. A coiled spring 47 surrounds the plunger member 44, bearing between the top wall 13 of housing 12 and a metal conductor plate or disc 48 surrounding plunger member 44. A second coiled spring 49 surrounds the plunger member 44 below the conductor disc 48, bearing between said conductor disc and a washer 50 provided on the plunger member and rigidly secured thereto. The bottom end of the plunger member is formed with a generally spherical, downwardly facing recess 52 which is engageable over the rounded top end 53 of the shank element 43 and which is adapted to at times receive said rounded top end 53 in the manner illustrated in FIGURE 2.

Designated at 54 and 55 are respective spaced switch contact terminals which are vertically mounted in the top wall 13 over the conductive disc 48 and which are bridgingly engaged by said disc when the pendulum rod 33 is in its vertical position with its rounded top end 53 received in the recess 52 in the manner illustrated in FIGURE 2. The terminals 54 and 55 are adapted to be connected between the vehicle battery and its electrical system, so that the device automatically disconnects the vehicle electrical system from the vehicle battery when the plunger member 44 is released and is allowed to move downwardly from the position illustrated in FIGURE 2.

The pair of additional switch contacts 29 and 30 are mounted in the intermediate wall member 19 below the conductor disc 48 and are located so as to be automatically bridged by the conductor disc when the plunger member 44 is released. The transmitter wires 27 and 28 are connected respectively to the contact members 29 and 30, so that the energizing circuit for the transmitter 25 is completed automatically when disc 48 descends to bridgingly engage the switch contact members 29 and 30.

The top end of the plunger member 44 projects above the top wall 13 of housing 12 and is provided with a reset handle 60 which may be employed to reset the switch device to the position thereof illustrated in FIGURE 2 after it has been triggered to its emergency condition responsive to an impact in a manner presently to be described.

The transmitter wires 27 and 28 extend through an opening 61 provided in the housing side wall 15, as is clearly shown in FIGURE 2. The front wall 18 of the housing is removable to provide access to the inside of the housing whenever necessary.

When the switch device is in the condition thereof illustrated in FIGURE 2, which is the normal condition of the apparatus, the spring 49 exerts an upward biasing force on the conductor disc 48, causing the contacts 54 and 55 to be conductively bridged, whereby the vehicle battery is connected to the vehicle electrical system. When an impact or collision occurs, the inertia of the weight 35 causes the pendulum rod 33 to swing away from the vertical position thereof shown in FIGURE 2 to a position such as that illustrated in FIGURE 4, whereby the tip 53 of shank element 43 disengages from the recess 52, releasing the plunger member 44. Coiled spring 47 then causes the disc 48 to be lowered, the coiled spring 47 being substantially stronger than the coiled spring 49, whereby the conductor disc 48 is brought into bridging contact with the terminals 30 and 29. The downward movement of the conductor disc 48 disconnects the vehicle batteries from the vehicle electrical system, minimizing the hazard of fire, and simultaneously causes the distress transmitter 25 to become energized, so that a distress signal is emitted from the vehicle, facilitating the location of the vehicle by police authorities or by rescue personnel.

The device may be readily reset to its normal condition by pulling upwardly on the knob 60, allowing the pendulum rod 33 to assume a vertical position, after which the plunger member 44 may be lowered to engage the rounded top end 53 of shank element 43 in the spherical recess 52. This supports the plunger member 44 in its elevated position, as illustrated in FIGURE 2.

As will be readily apparent, housing 12 may be mounted in the bracket member 20 either in the position shown in FIGURES 1, 2 and 3, namely, with the removable wall 18 facing forwardly, or in the position shown in FIGURE 4, with the removable wall portion facing rearwardly, since the housing is symmetrical with respect to the vertical plane containing the fastening bolts 32.

The amount of impact required to dislodge pendulum rod 33 from its vertical centered position can be governed by employing a coiled spring 47 having sufficient tension to prevent dislodgement of the pendulum unless the specified amount of impact is present. Similarly, the weight 35 may be selected in accordance with the holding force provided by the spring 47, and the sensitivity of response may be adjusted by adjusting the position of said weight 35 on the pendulum rod 33, since the weight is threadedly engaged on said rod. The weight may be locked in adjusted position by tightening the lock nut 36, as above described.

While a specific embodiment of an improved impact switch device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An impact switch adapted to be mounted in a vehicle to control the vehicle electrical system and to energize a distress transmitter comprising a housing having an intermediate partition wall, a pendulum pivotally mounted in the bottom wall of said housing, said pendulum having an upstanding shank element extending upwardly into the housing, a vertical plunger member slidably mounted in the top wall and said intermediate partition wall of the housing in vertical alignment with said pendulum, said plunger member having a concave bottom end engageable over and receiving the top end of said shank element, a conductive plate resiliently secured to said plunger member, spring means biasing said plunger member downwardly, a pair of spaced switch contacts mounted in the top wall of the housing and being engageable by said conductive plate when the pendulum is in a vertical position with the top end of the shank element received in said concave bottom end, said contacts being adapted to be connected in circuit with the vehicle electrical system, and a pair of additional spaced switch contacts mounted in the intermediate partition wall below said conductive plate and adapted to be connected in the energizing circuit of a distress transmitter, said conductive plate being movable into bridging engagement with said additional contacts responsive to the pivoting of said shank element out of engagement with the bottom end of said plunger member.

2. An impact switch adapted to be mounted in a vehicle to control the vehicle electrical system and to energize a distress transmitter comprising a housing having an intermediate partition wall, a pendulum pivotally mounted in the bottom wall of said housing, said pendulum having an upstanding shank element extending upwardly into the housing, a vertical plunger member slidably mounted in the top wall and said intermediate partition wall of the housing in vertical alignment with said pendulum, said plunger member having a concave bottom end engageable over and receiving the top end of said shank element, a conductive plate resiliently secured to said plunger member, spring means biasing said plunger member downwardly, a pair of spaced switch contacts mounted in the top wall of the housing and being engageable by said conductive plate when the plunger member is in a vertical position with the top end of the shank element received in said concave bottom end, said contacts being adapted to be connected in circuit with the vehicle electrical system, and a pair of additional spaced switch contacts mounted in the intermediate partition wall below said conductive plate and adapted to be connected in the energizing circuit of a distress transmitter, said conductive plate being movable into bridging engagement with said additional contacts responsive to the pivoting of said shank element out of engagement with the bottom end of said plunger member, said plunger member extending above the top wall of said housing and being provided at its top end with a reset handle.

3. An impact switch adapted to be mounted in a vehicle to control the vehicle electrical system and to energize a distress transmitter comprising a housing having an intermediate partition wall, a pendulum comprising a weighted rod having an intermediate pivot ball thereon, socket means in the bottom wall of the housing rotatably receiving said pivot ball, whereby the upper portion of said rod projects upwardly into the housing, a vertical plunger member slidably mounted in the top wall and said intermediate partition wall of the housing in vertical alignment with said pendulum, said plunger member having a concave bottom end engageable over and receiving the top end of said upper portion of the pivot rod, a conductive plate resiliently secured to said plunger member, spring means biasing said plunger member downwardly, a pair of spaced switch contacts mounted in the top wall of the housing and being engageable by said conductive plate when the pendulum is in a vertical position with the top end of said pivot rod upper portion received in said concave bottom end, said contacts being adapted to be connected in circuit with the vehicle electrical system, and a pair of additional spaced switch contacts mounted in the intermediate partition wall below said conductive plate and adapted to be connected in the energizing circuit of a distress transmitter, said conductive plate being movable into bridging engagement with said additional contacts responsive to the pivoting of said pivot rod upper portion out of engagement with the bottom end of said plunger member, said plunger member extending above the top wall of said housing and being provided at its top end with a reset handle.

References Cited in the file of this patent

UNITED STATES PATENTS

| | | |
|---|---|---|
| 2,236,872 | Grigsby | Apr. 1, 1941 |
| 2,331,017 | Ericson | Oct. 5, 1943 |
| 2,778,896 | Tollefsen | Jan. 22, 1957 |